United States Patent [19]

Shtipelman et al.

[11] Patent Number: 5,016,238
[45] Date of Patent: May 14, 1991

[54] LINEAR ACTUATOR FOR RADIAL ACCESS IN DISK RECORDER/PLAYER

[75] Inventors: Boris A. Shtipelman, Rochester; Paul Heppner, Hilton, both of N.Y.

[73] Assignee: Eastman Kodak Company, Rochester, N.Y.

[21] Appl. No.: 305,689

[22] Filed: Feb. 3, 1989

[51] Int. Cl.⁵ .............................................. G11B 21/10
[52] U.S. Cl. .................................. 369/215; 369/249; 369/247; 318/135; 318/687
[58] Field of Search .................... 369/43, 44, 32, 33, 369/247, 248, 249, 215; 360/106, 107; 318/135, 687; 310/12, 13, 14

[56] References Cited

U.S. PATENT DOCUMENTS

| | | | |
|---|---|---|---|
| 3,771,034 | 11/1973 | Wallskog | 318/135 |
| 3,904,900 | 9/1975 | Shichida et al. | 318/135 X |
| 4,044,881 | 8/1977 | Chai et al. | 318/135 X |
| 4,149,808 | 4/1979 | Matthias et al. | 318/135 X |
| 4,151,447 | 4/1979 | Heide et al. | 318/135 |
| 4,445,798 | 5/1984 | Munehiro | 318/135 X |
| 4,594,520 | 6/1986 | Miwa et al. | 318/135 X |
| 4,613,962 | 9/1986 | Inoue et al. | 318/135 |
| 4,623,806 | 11/1986 | Yoshikawa | 318/135 X |
| 4,631,432 | 12/1986 | Thaler | 318/135 X |
| 4,652,800 | 3/1987 | Fukuwatari | 318/135 |
| 4,808,901 | 2/1989 | Sakamoto | 318/135 X |
| 4,823,336 | 4/1989 | Inada et al. | 369/249 X |
| 4,825,773 | 5/1989 | Marishita et al. | 318/135 X |
| 4,932,019 | 6/1990 | Bessho | 3690/249 X |

Primary Examiner—Paul Ip
Attorney, Agent, or Firm—Warren W. Kurz

[57] ABSTRACT

Disclosed herein is a linear actuator for controlling the movement of a payload along a linear trajectory. Such actuator is particularly useful, for example, in controlling the radial position of a write/read head in an optical or magnetic recorder/player. The actuator comprises a simple elongated ferromagnetic member, preferably having a substantially triangular cross-section. Such member is surrounded by a coil to which a payload-bearing carriage is rigidly connected. Bearing devices are provided for slidably mounting the carriage for movement on and along the ferromagnetic member. A plurality of magnets serve to establish a magnetic field through which the coil, upon applicaiton of a current, is advanced along the ferromagnetic member. The ferromagnetic member serves the dual function of conducting magnetic flux and guiding the payload along the linear trajectory.

6 Claims, 2 Drawing Sheets

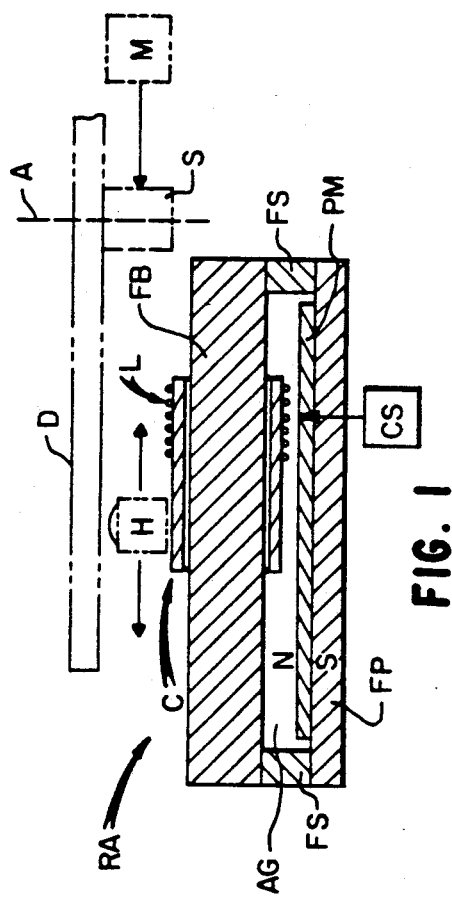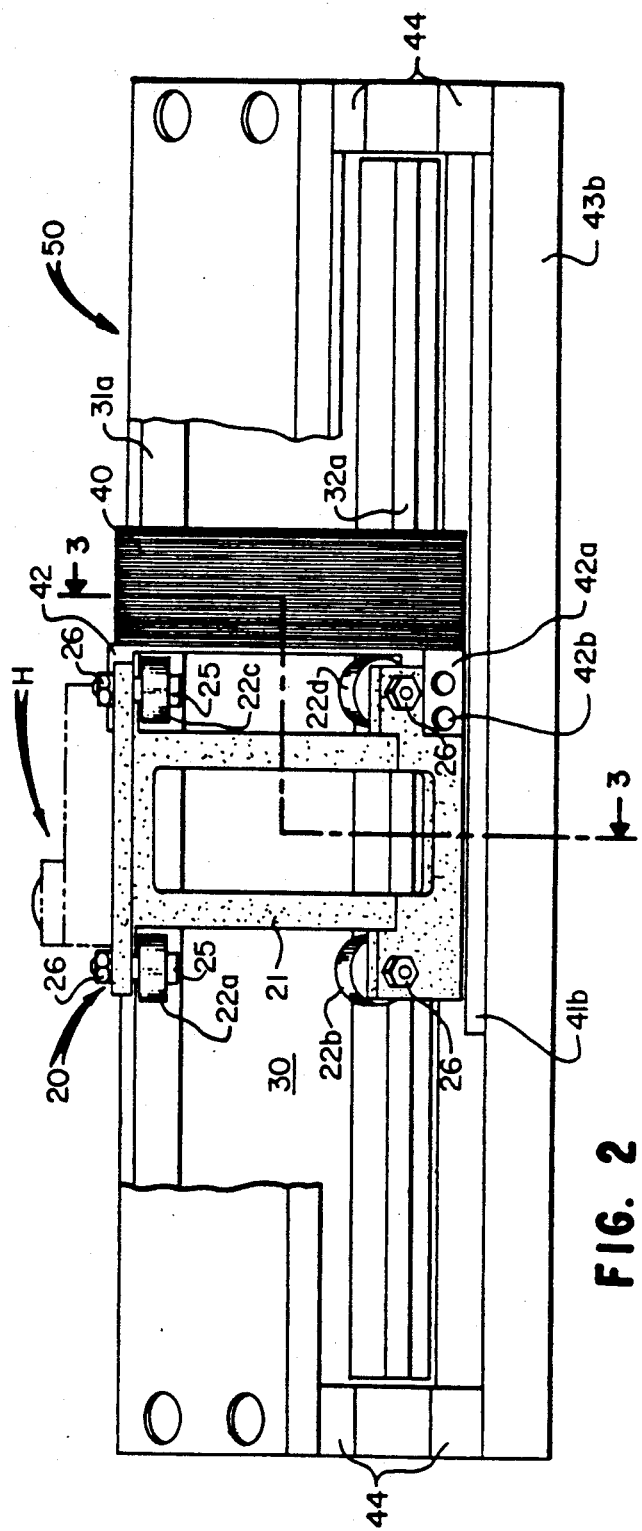

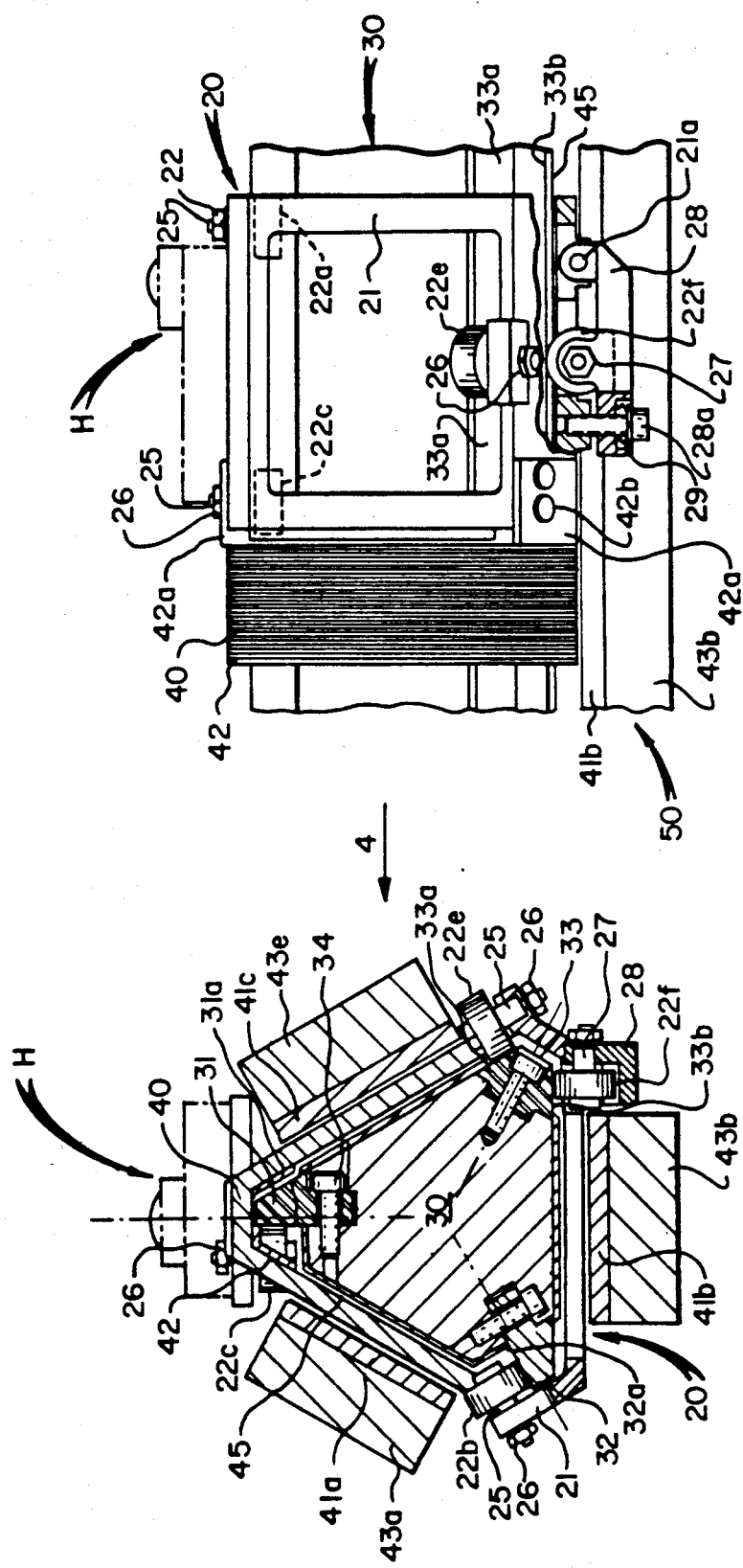

LINEAR ACTUATOR FOR RADIAL ACCESS IN DISK RECORDER/PLAYER

BACKGROUND OF THE INVENTION

The present invention relates to improvements in apparatus for controlling the position of a payload along a linear trajectory. It is particularly useful in the field of data recording and playback for controlling the radial position of a write/read head relative to the recording surface(s) of data storage disks (e.g. magnetic, magneto optic, and optical disks) so that information can be written on (or read from) a desired data track.

Heretofore, a variety of radial access mechanisms have been proposed and utilized to control the radial position of a write/read head in a disk recorder/player. Typically, such mechanisms function to advance the write/read head along arcuate or linear trajectories in a plane parallel to the plane of disk rotation. One such mechanism is disclosed in U.S. Pat. No. 4,763,314 issued to M. J. McCaslin et al. on Aug. 9, 1988. Here, the write/read head is moved along a linear trajectory by an electro magnetic actuator comprising a pair of spaced, parallel rods which extend generally transverse to the data tracks on a data storage disk. Each of the rods is made of a ferromagnetic material and, together, the rods function to guide a write/read head bearing carriage along a straight trajectory. A pair of actuator coils are connected to the carriage, each coil surrounding one of the rods for linear movement therealong. Each of the ferromagnetic rods is partially surrounded by a generally C-shaped, radially polarized permanent magnet, each magnet being spaced from the rod so as not to obstruct movement of the carriage along the rod. Upon applying a suitable current to the coils, the coils and their associated carriage move through the magnetic field established by the magnets and, as already noted, are guided along the straight trajectory defined by the ferromagnetic rods.

The linear actuator disclosed in the above-referenced patent is relatively compact in size owing to the fact that the ferromagnetic rods serve to both guide the carriage along the straight trajectory, and to provide a return path for the magnetic flux produced by the permanent magnets. (Note, in many other linear actuators proposed heretofore, these two functions are provided by separate elements.) Though compact in size, linear actuators of this type suffer certain disadvantages. For example, because of the construction and location of the permanent magnets, only about half of the area of the actuator coils is subjected to the magnetic field. This has the effect of decreasing the efficiency of the motor. Also, since two rods are used to guide carriage, their location in relation to each other and to the carriage which they support becomes very critical and requires a very precise assembly procedure. Moreover, because there are two ferromagnetic bars and associated coils, there are, in essence two electromagnetic (voice coil-type) motors which must be balanced in operation.

SUMMARY OF THE INVENTION

In view of the foregoing, an object of the present invention is to provide an improved linear actuator of the above type, one which is improved from the standpoints that it makes more efficient use of the current applied to the coils, is easier to assemble, and is even more compact in size.

The linear actuator of the invention basically comprises a carriage for supporting a payload (e.g. a write/read head), a single rod of ferromagnetic material, a single actuator coil surrounding such rod, such coil being rigidly coupled to the carriage, and bearing means for slidably mounting the carriage on the rod so that the carriage has but one degree of freedom to move relative to the rod, namely, in a direction parallel to the intended linear trajectory. Means are provided for controlling the current flow through the actuator coil to control the position of the coil along the rod and, hence, the position of the payload along the linear trajectory. Having but a singular guide member which also functions as a flux returning path for the magnetic circuit, the actuator becomes a compact, self contained mechanism with relaxed accuracy requirements during its manufacture, assembly and installation.

The invention and its various advantages will become more apparent to those skilled in the art from the ensuing detailed description of a preferred embodiment, reference being made to the accompanying drawings.

BRIEF DESCRIPTION OF THE DRAWINGS

FIG. 1 is a schematic drawing illustrating the inventive concept;

FIG. 2 is an overall side view of a linear actuator embodying the invention;

FIG. 3 is a sectional view of the FIG. 2 apparatus taken along the composite section line 3—3; and FIG. 4. is partial side view of the FIG. 3 mechanism taken in the direction of arrow 4, opposite the side view shown in FIG. 1.

DETAILED DESCRIPTION OF PREFERRED EMBODIMENTS

Referring to the drawings, FIG. 1 schematically illustrates an optical recording system in which an optical disk D mounted on a spindle S is rotated at high speed by a motor M. Concentrically arranged on the disk are a plurality of circular, or near circular, tracks along which data has been recorded or is to be recorded. To effect recording or playback of such data, a radial access mechanism RA is provided for translating an optical write/read head H in a radial direction, as indicated by the arrows, so as to position a focused laser beam on a desired data track on the disk. The optical write/read head is mounted atop a carriage C which is rigidly coupled to an actuator coil L. The coil surrounds an elongated ferromagnetic bar FB of uniform cross section, and a permanent magnet PM, which may nearly totally surround the ferromagnetic member, is provided to establish a magnetic field across an air gap AG separating the ferromagnetic member from the magnet. Ferromagnetic plate FP and spacers FS are provided for completing the magnetic circuit. When a suitable current is applied to the coil by a current source CS, the coil moves within the magnetic field in a direction determined by the sign of the current, at a rate determined by the amplitude of such current. When the current is discontinued, the optical head will assume a position opposite the desired track on the disk.

In the FIG. 1 apparatus, it will be apparent that the ferromagnetic member FB functions both to guide the payload's carriage along a rectilinear path, and to provide a return path for the magnetic flux produced by the permanent magnet. Also to be noted is the fact that a singular ferromagnetic member is used to achieve these functions. As indicated above, it is preferred that the permanent magnet member substantially enclose the ferromagnetic member, thereby increasing the efficiency of the voice-coil motor. A preferred implementation of the concept shown in FIG. 1 is described below.

Referring to FIGS. 2–4, a preferred embodiment of the linear actuator of the invention is shown to comprise a movable carriage 20 which functions to support a payload (e.g. write/read head H). Carriage 20 comprises a three sided frame 21, best shown in FIG. 3, which is preferably made of light-weight metal, such as aluminum or magnesium. Carriage frame 21 supports five roller bearings 22a–22e, each being rotatably supported on a stubbed shaft 25 which may be press fit into the carriage frame or, alternatively, may have a threaded end which fits through a circular aperture in the frame and, as shown, is secured to the frame by a nut 26. A sixth bearing 22f is rotatably supported by a shaft 27 carried by a movable arm 28, the latter being pivotally mounted on the carriage frame by a pivot pin 21a. The position of arm 28 relative to pivot pin 21a is controlled by a bolt 28a having a threaded end which passes through an opening in the free end of arm 28 and mates with a threaded opening in the carriage frame. As will be explained below, the pivotal mounting of arm 28 is used to preload the six bearings against the surfaces on which they roll during linear movement of the carriage.

Carriage 20 is supported for movement along a linear trajectory by an elongated ferromagnetic member 30, which may comprise, for example, a bar of soft iron. Member 30, which preferably has a substantially triangular cross section, supports three parallel "ways" 31–33 which serve to guide and support the carriage bearings 22a–22f as the bearings rotate about their respective shafts. Preferably, all three of the ways are made of a non-magnetic and hardened metal (e.g. stainless steel), and their respective bearing-contacting surfaces (i.e., surfaces 31a, 32a, 33a and 33b) are ground so as to be as nearly flat as possible. As shown in FIG. 2, surface 31a serves to support roller bearings 22a and 22c, and surface 32a supports roller bearings 22b and 22d. Way 33 has two bearing contacting surfaces 33a and 33b which serve to support bearings 22e and 22f, respectively. Each of the ways 31–33 is connected to the ferromagnetic member by dowels (not shown) and bolts 34. Preferably, all of the bearing-contacting surfaces are ground in one set up procedure so that accuracy and geometrical tolerances can be achieved in the machining process. It will be noted that surfaces 32a and 33a are perpendicular to each other, as are surfaces 31a and 33b. To simplify alignment procedures, the outside diameters of the bearings may be crowned.

By arranging the six roller bearings in the positions shown, the carriage is permitted only one degree of freedom, i.e., freedom to move only in a direction parallel to the longitudinal axis of member 30. Notice that four of the bearings (22a–22d) are located in the corners of the carriage frame, with the other two bearings (22e and 22f) being in the middle of its opposite side. Bearing 22f rotates in a plane perpendicular to the rotational plane of bearings 22a and 22c, and bearing 22e rotates in a plane perpendicular to the rotational planes of bearings 22b and 22d. The bearings are preloaded in the positions shown by the preloading of bearing 22f against surface 33b, which occurs when Belleville springs 29 are compressed as arm 28 is locked in the position shown in FIG. 4 by tightening bolt 28a.

Movement of the carriage 20 along member 30 is effected by a voice coil type motor comprising an actuator coil 40 and magnetic field producing means 50. Coil 40 is wound about a bobbin 42 having a triangular cross-section. Bobbin 42 has flanged ends 42a which are rigidly connected to the back end of the carriage frame by screws 42b or the like. Bobbin 42 and its associated coil surround the ferromagnetic member 30 and are separated from member 30 by a small air gap. A magnetic field is established across this air gap by three permanent magnets 41a–41c which are magnetized in a direction normal to their face surfaces. Each magnet is backed by flux-returning steel plates 43a–43c. Ferromagnetic spacers 44 serve to complete the magnetic circuits and, at the same time, establish the necessary air gap between the magnets and the ferromagnetic member 30, along each of the ferromagnetic member's three sides. To decrease the effective inductance of the coil, member 30 is preferably clad by a copper sleeve 45 which is used as a so called "shorted turn."

In operation, current is selectively applied to the coil by current source CS. Depending on the direction and amplitude of the applied current, the coil advances along member 30, such movement being limited to a linear trajectory by the bearing/way arrangement. Notice that the singular ferromagnetic member 30 is the main flux carrying component of the motor, and this member and its associated ways 31–33 also function to guide carriage 20 along its intended trajectory.

Compared to the aforementioned prior art mechanism, the linear actuator of the invention is particularly advantageous from the following standpoints:

(a) the mechanism is more efficient since a substantial portion of the coil is located in the motor air gap penetrated by the magnetic flux and, hence, a larger force constant is achievable;

(b) the actuator is a self contained and more compact device requiring no external elements for carriage guidance;

(c) the assembly and installation of the apparatus is greatly simplified since only one internal part (the motor center bar) is used to guide the carriage with the required accurate assured during a single set up machining.

The invention has been described in detail with particular reference to preferred embodiments thereof, but it will be understood that variations and modifications can be effected within the spirit and scope of the invention.

We claim:

1. A linear actuator for controlling the movement of a payload along a linear trajectory, said actuator comprising:

a single elongated ferromagnetic member extending in a direction parallel to said trajectory, said member having a substantially triangular cross-section defined by three planar sides whose respective planes intersect, said ferromagnetic member detachably supporting a plurality of spaced, parallel ways which are contacted by said bearing means as said carriage slides along said ferromagnetic member, said ways defining four planar surfaces which are adapted to contact said bearing means, two of said surfaces being perpendicular to each other, and the remaining two of said surfaces being perpendicular to each other and angularly disposed with respect to the other two of said surfaces; p1 a carriage for supporting a payload;

an actuator coil surrounding said ferromagnetic member, said coil being rigidly coupled to said carriage;

bearing means for slidably mounting said carriage for movement along said elongated member, said ferromagnetic member functioning to guide said carriage along a path parallel to said trajectory, said bearing means comprising a plurality of roller bearings rotatably mounted on said carriage and positioned to engage said member so that said carriage can move only in a direction parallel to said trajectory;

magnetic filed-producing means spaced about said ferromagnetic member for producing a permanent magnetic field perpendicular to said three planar sides, in the vicinity of said coil; and means for controlling current flow through said coil to control the position of said coil along said member and, hence, the position of the payload along a linear trajectory.

2. The apparatus as defined by claim 1 wherein said ferromagnetic material is soft iron.

3. The apparatus as defined by claim 1 wherein said ferromagnetic member is clad in copper.

4. The apparatus as defined by claim 1 wherein said ferromagnetic member comprises soft iron, and wherein said ways comprise hardened steel.

5. The apparatus as defined by claim 1 wherein said bearing means comprises six roller bearings, five of said bearings being rotatably mounted on said carriage, the sixth bearing being spring preloaded and rotatably mounted on an arm which is pivotally mounted on said carriage.

6. The apparatus as deFined by claim 5 wherein two of said six bearings are positioned to engage a first one of said planar surfaces, wherein two other of said six bearings are positioned to engage a second one of said planar surfaces, said first and second surfaces being non perpendicular, and wherein each of the remaining two of said six bearings is arranged to engage one of the remaining two planar surfaces.

* * * * *